United States Patent [19]

McCurdy

[11] Patent Number: 6,084,314
[45] Date of Patent: Jul. 4, 2000

[54] INTEGRATED OCCUPANT PROTECTION SYSTEM

[75] Inventor: Roger A. McCurdy, Troy, Mich.

[73] Assignee: TRW Inc., Lyndhurst, Ohio

[21] Appl. No.: 09/132,542

[22] Filed: Aug. 11, 1998

[51] Int. Cl.[7] ............................................. B60R 21/00
[52] U.S. Cl. ................................................ 307/10.1
[58] Field of Search .............................. 180/268, 271, 180/274; 280/728.1, 730.2, 733, 735; 307/10.1

[56] References Cited

U.S. PATENT DOCUMENTS

| | | |
|---|---|---|
| 3,525,875 | 8/1970 | Ziomek . |
| 3,544,803 | 12/1970 | Taylor . |
| 3,819,205 | 6/1974 | Dunford et al. . |
| 3,821,559 | 6/1974 | Ueda et al. . |
| 4,122,357 | 10/1978 | Sumida . |
| 4,463,341 | 7/1984 | Iwasaki . |
| 4,736,367 | 4/1988 | Wroblewski et al. . |
| 4,907,222 | 3/1990 | Slavik . |
| 5,366,241 | 11/1994 | Kithil . |
| 5,439,249 | 8/1995 | Steffens, Jr. et al. . |
| 5,466,001 | 11/1995 | Gotomyo et al. . |
| 5,529,377 | 6/1996 | Miller .................................. 297/284.6 |
| 5,590,904 | 1/1997 | Ellis et al. . |
| 5,704,638 | 1/1998 | Lane, Jr. ............................. 280/730.2 |
| 5,707,076 | 1/1998 | Takahashi ............................. 280/735 |
| 5,707,077 | 1/1998 | Yokota et al. ......................... 280/735 |
| 5,760,489 | 6/1998 | Davis et al. .......................... 307/10.1 |
| 5,859,583 | 1/1999 | Mayumi et al. . |
| 5,871,063 | 2/1999 | Young ..................................... 180/268 |
| 5,949,340 | 9/1999 | Rossi .................................... 340/573.1 |

FOREIGN PATENT DOCUMENTS

| | | |
|---|---|---|
| 0680854A2 | 3/1995 | European Pat. Off. . |
| 0768216A1 | 4/1997 | European Pat. Off. . |

OTHER PUBLICATIONS

Copy of GB Search Report.

*Primary Examiner*—Jeffrey Gaffin
*Assistant Examiner*—Rios Roberto
*Attorney, Agent, or Firm*—Tarolli, Sundheim, Covell, Tummino & Szabo L.L.P.

[57] ABSTRACT

An integrated occupant protection system (10) for a vehicle comprises a vehicle seat (12), which may be mounted in the vehicle. The seat (12) has a lower seat portion (14) and a seat back portion (16). An electrical communications bus (26) is mounted to the vehicle seat (12). A crash sensor (44) also is mounted to the vehicle seat (12) and electrically coupled to the communications bus (26). The crash sensor (44) senses a crash event and provides a signal indicative thereof to the communications bus (26). An actuatable occupant protection device (46, 48, 50 or 64) is mounted to the vehicle seat (12) and electrically coupled to the communications bus (26). When the protection device (46, 48, 50 or 64) is actuated, it helps to protect a vehicle occupant. The occupant protection device (46, 48, 50 or 64) is controlled over the communications bus (26) by a controller (47, 34).

23 Claims, 1 Drawing Sheet

INTEGRATED OCCUPANT PROTECTION SYSTEM

TECHNICAL FIELD

The present invention relates to a vehicle occupant protection system, and more particularly to an integrated occupant protection system which is part of a vehicle seat.

BACKGROUND OF THE INVENTION

Numerous vehicle occupant protection systems have been developed to help protect vehicle occupants during various types of crash events. Known actuatable occupant protection systems include, for example, front passenger and driver side air bags, seat belt pretensioner devices, side impact air bags, and air bags for the head. Crash sensors are used in such protection systems to sense various types of crash events.

Known occupant safety equipment often requires substantial assembly and burdensome installation procedures by automobile manufacturers. The manufacturers also frequently purchase and install safety equipment as individual components. This generally results in undesirable expenses associated with inventory and with the installation and testing of such components.

SUMMARY OF THE INVENTION

The present invention is directed to an integrated occupant protection system for a vehicle. The system includes a vehicle seat mountable in the vehicle. The seat has a lower seat portion and a seat back portion. An electrical communications bus is mounted to the vehicle seat. A crash sensor is mounted to the vehicle seat and electrically coupled to the communications bus. The crash sensor senses a crash event and provides a signal indicative thereof to the communications bus. An actuatable occupant protection device is mounted to the vehicle seat and electrically coupled to the communications bus. When the protection device is actuated in response to a crash event, it helps to protect a vehicle occupant.

BRIEF DESCRIPTION OF THE DRAWING

The foregoing and other features and advantages of the invention will become apparent to one skilled in the art upon consideration of the following description of the invention and the accompanying drawing in which.

DESCRIPTION OF A PREFERRED EMBODIMENT

Figure 1:
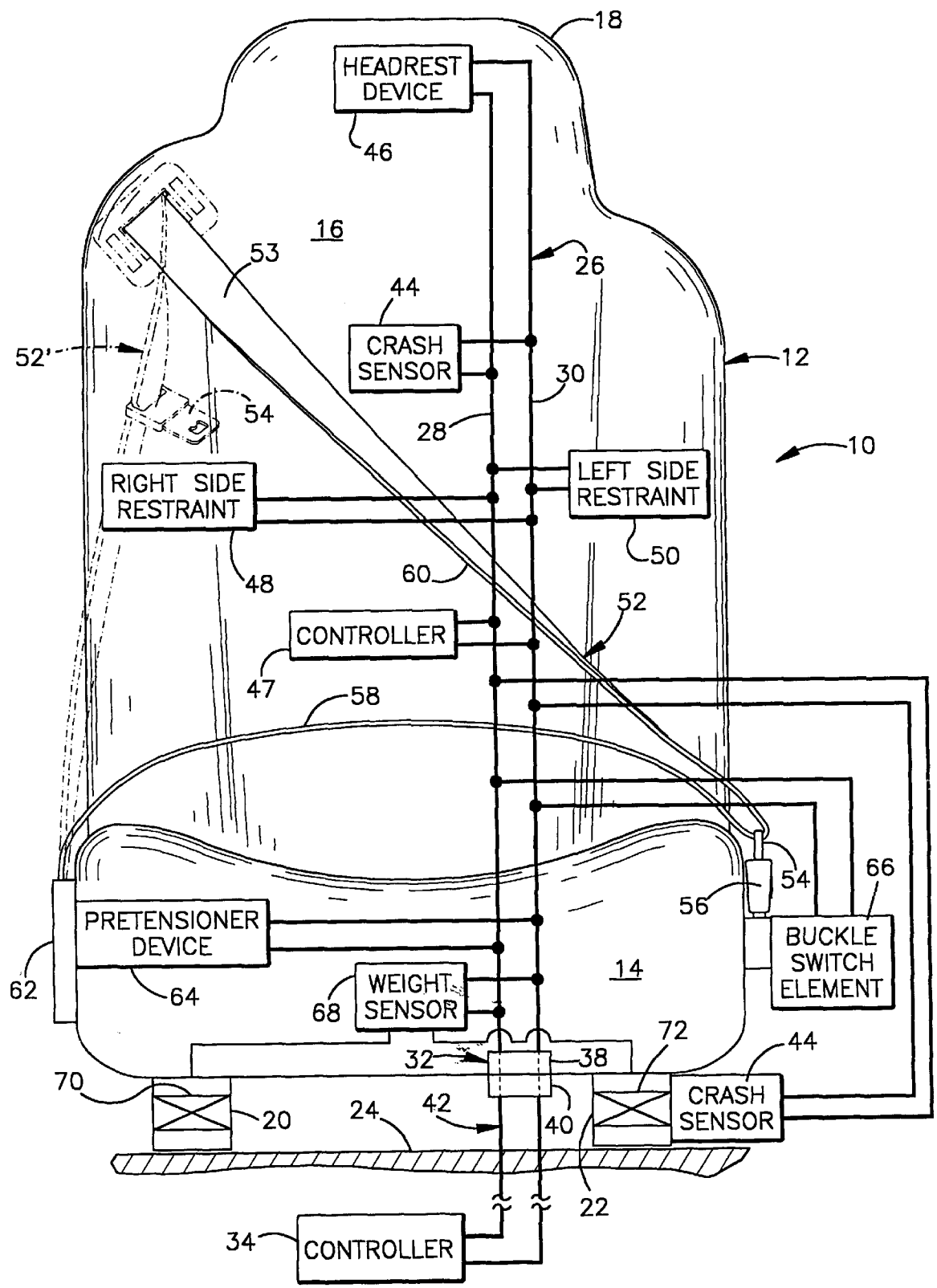
FIG. 1 is a schematic illustration of an integrated occupant protection system in accordance with a preferred embodiment of the present invention.

A preferred embodiment of an integrated occupant protection system, generally indicated at 10, is illustrated in FIG. 1. The protection system 10 is integrated as part of a modular vehicle seat 12. The seat 12 includes a lower seat portion 14 and a seat back portion 16. The seat also includes an integral headrest portion 18 at the upper end of the seat back portion 14. Alternatively, the seat 12 might include an adjustable headrest.

The seat 12 is mountable in a vehicle in a known manner. For example, the seat 12 includes a pair of spaced apart and parallel seat tracks 20 and 22 affixed along the bottom portion of the lower seat portion 14. Another part of the seat tracks 20 and 22 is secured to a lower body portion of the vehicle 24. In general, the seat tracks 20 and 22 are formed of sliding members that permit front-to-aft adjustment of the seat 12 relative to the lower body portion 24 of the vehicle.

The system 10 also includes an electrical communication bus 26 mounted to the vehicle seat 12. Preferably, the bus 26 is mounted within an internal portion of the seat 12. The bus 26 is formed of a cable having two wires 28 and 30. The first wire 28 provides power, control, diagnostic, and status information to and from various system components. The second wire 30 provides an electrical power return from such components. It will be understood and appreciated by those skilled in the art that, alternatively, a single wire communications bus, over which both electrical power and control information are provided, may be used in combination with a chassis return.

A connector, indicated at 32, provides an interface for electrically connecting appropriate external devices to the bus 26. Such external devices may include an electronic controller 34 which provides a suitable external source of power to the restraint system. Preferably, the connector 32 includes mating first and second connector parts 38 and 40. The first connector part 38 may be part of the vehicle seat 12, as shown, or it may be spaced from the seat 12 by an appropriate length of the cable. The second connector part 40 is attached to another cable which forms at least part of or is connected to an external communications bus 42. The external bus 42 is electrically coupled to devices separate from the vehicle seat 12. The external bus 42 may be part of a vehicle communications system, with the bus 26 forming a subsystem thereof. The external bus 42 suitably includes two wires, both electrically connected with the controller 34. The connector 32 couples the external bus 42 to the communications bus 26 of the seat 12.

The controller 34, for example, may be the central controller for a vehicle occupant protection system and preferably is a microcomputer. The controller 34 also may be an integrated circuit, a plurality of discrete components or a combination of discrete components and integrated circuits configured to provide desired control functions.

The power source from controller 34 may be at vehicle battery level or a separate circuit electrically connected to the battery or alternator for providing a predetermined amount of power to the power line 28 of the bus 26.

The occupant protection system 10 further includes a plurality of components connected to or part of the vehicle seat 12, each of which is electrically coupled to the bus 26. Each component is addressable over the bus 26 using a known communication scheme, such as, for example, time division multiplexing or frequency division multiplexing. Accordingly, each component includes an appropriate demultiplexing circuit according to the particular scheme being used. Similarly, system components which provide signals to the bus 26 include appropriate multiplexing circuitry. Using an appropriate addressing scheme, information can be supplied to or retrieved from each component separately.

A crash sensor 44 is mounted to the vehicle seat 12. Preferably, the crash sensor 44 is rigidly secured to the frame of the seat 12, although it may be mounted within the seat. The crash sensor 44 may take any of several forms, including an inertia switch or an acceleration sensing device. Preferably, the crash sensor 44 is an accelerometer of the type that outputs an electrical signal having a characteristic indicative of a vehicle crash event upon the occurrence of a crash event. The crash sensor 44 is electrically coupled to the communication bus 26 and provides a signal indicative of the sensed crash event through the bus 26. By providing an acceleration sensing device as part of the vehicle seat, a more accurate indication of crash acceleration may be obtained for a vehicle occupant in the corresponding seat. The signal may be addressed to one or more components within seat 12, to an internal controller 47, or to an external device, such as the controller 34. Either the controller 47 or controller 34 will perform a crash algorithm on the crash signal and control actuatable restraint devices in the seat in response to the crash signal.

The crash sensor 44 may be a side impact crash event sensor for sensing a side impact crash event. The crash event sensor 44 also may be a multi-directional sensor, or comprise a plurality of sensors for detecting a crash event originating from any of a plurality of directions. Such a multi-directional sensor provides a signal to the communication bus 26 indicating the occurrence of a crash event and the direction or directions from which such crash event originated. The crash sensor 44 also may be configured to sense a vehicle rollover condition and provide a rollover signal in response to such event.

The crash sensor 44 preferably is electrically connected to the external controller 34 over the bus 26 and the external bus 42. The controller 34 analyzes the output signal from the crash sensor 44 and determines if a deployment crash condition is occurring. A deployment crash condition is one in which actuation of an actuatable occupant protection devices is desired. The controller 34 also determines which, if any, actuatable device should be activated in response to the crash sensor signal and when said actuation should occur. A suitable controller device 47 also may be part of the modular seat 12 and be electrically coupled directly to the seat communications bus 26. The control of certain restraint devices of seat 12 could be controlled by the internal controller 47.

The system 10 includes at least one and preferably a plurality of actuatable occupant protection devices mounted to, and preferably within, the vehicle seat 12. One such device is an actuatable headrest device 46 mounted to the vehicle seat 12 at the upper end of the seat back 16. This actuatable device 46 suitably is mounted within the headrest portion 18 of the seat 12. Preferably, the headrest occupant protection device 46 is an inflatable occupant protection device, such as an air bag, which may be actuated, for example, in response to the crash sensor 44 providing a signal indicating the occurrence of a rear impact crash event or a rollover condition. The actuatable headrest device 46 may be inflatable upward to help protect the occupant's head.

Actuation of the actuatable headrest device 46 may be controlled by signals from the controller 34 in response to a sensed crash event. The control signals are addressed to the headrest device 46. Alternatively, the headrest device 46 may be actuated directly in response to the crash sensor signals on the bus 26 indicating a desirable deployment condition or under control of the internal controller 47. Such an on-board controller 47 preferably would be in communication with the vehicle central controller 34, such as for the relay of status and other information.

The system 10 also preferably includes actuatable occupant protection devices for helping to protect a vehicle occupant during a side impact crash event. Such devices are schematically illustrated as right and left side restraints 48 and 50. The right and left side restraints 48 and 50 are electrically coupled to the bus 26. The right and left side restraints 48 and 50 preferably are inflatable occupant protection device, such as, for example, air bags, which cushion an occupant during a side impact crash event. Preferably, an occupant seat would include only one side restraint. A passenger's seat would have the right side restraint 48 and a driver's seat would have the left side restraint 50. For the purpose of discussion, the seat 12 includes both restrains 48, 50.

The right side restraint 48 helps cushion a vehicle occupant of the seat 12 (e.g., a passenger) when the crash sensor 44 detects a crash event originating from the right side of the vehicle. The right side restraint 48 may be actuated upon detecting a crash sensor signal on the bus 26 indicating a right side crash event. The crash signal may come directly from the sensor 44 or from the internal controller 47. Alternatively, the central controller 34 may receive the crash sensor signal and determine that a deployment crash event exists requiring actuation of the right side restraint device 48. The controller 34 then provides an appropriate control signal to the information line 28 of the bus 26 addressed to the right side restraint 48. The right side restraint 48 actuates in response to the control signal.

Similarly, the left side restraint 50 helps cushion a vehicle occupant of the seat 12 (e.g., a driver) upon the crash sensor 44 detecting the occurrence of a crash event from the left side of the vehicle. The left side restraint 50 actuates upon detecting an appropriate signal from the bus 26. The signal may be the crash sensor signal provided directly by the crash sensor 44 or a control signal from the internal controller 47. Alternatively, the central controller 34 may receive the crash sensor signal. The controller 34, upon determining the occurrence of a deployment crash event on the left side of the vehicle, provides a control signal addressed to the left side restraint 50. The left side restraint 50 receives the control signal from the information line 28 of the bus 26 and actuates in response thereto.

Preferably, the system 10 also includes a seat belt assembly, indicated at 52, which is part of the vehicle seat 12. The seat belt assembly 52 is illustrated in the buckled position, with the unbuckled position shown in phantom at 52'. The seat belt assembly 52 includes a webbing 53 and a buckle tongue 54. The buckle tongue 54 is slidable along the length of the seat belt webbing 53, and is releasably lockable in a buckle 56. The buckle tongue 54 divides the webbing 53 into a lap portion 58 and a chest portion 60, which may be positioned around a vehicle occupant.

The seat belt assembly 52 also includes a seat belt retractor 62 mounted to and suitably forming part of the vehicle seat 12. The retractor 62 is mounted adjacent to a side of the lower seat portion 14 opposite from the buckle 56. The retractor 62 also could be mounted within a shoulder portion of the seat back 16 or to the buckle-side of the seat 12. The seat belt retractor 62 suitably includes a spool (not shown) upon which the webbing 53 is wound in a known manner.

An actuatable pretensioner device 64 is operatively coupled to the retractor 62 for causing the retractor 62 to take up, or wind, the seat belt webbing 53 onto the spool under predetermined conditions to remove slack from the seat belt webbing. Alternatively, the pretensioner device 64 may be connected to the buckle 56. When actuated, such a pretensioner device 64 would urge the seat belt 56 downward to pretension the seat belt webbing 53 around the occupant of the seat 12. The pretensioner device 64 is electrically coupled to the bus 26, from which it receives control signals as well as electrical power.

The system 10 also preferably includes a buckle switch element 66, which detects the presence or absence of the tongue 54 within the buckle 56. The buckle switch 66 is electrically coupled to the bus 26 and provides a signal, when addressed, indicative of the buckle condition, i.e., buckled or unbuckled, to the bus 26. The buckle switch signal may be received by the controller 34 or by other system components. For example, the pretensioner device 64 preferably actuates where the buckle switch 66 detects a buckled seat belt condition and the crash sensor 44 detects a crash event. The pretensioner device 64 may be actuated upon receiving appropriate control signals over the bus 26 directly from the crash sensor 44 and buckle switch 66 or from the internal controller 47. Alternatively, the central controller 34 may receive the crash sensor signal and the buckle switch signal on the bus 26 and determine that vehicle condition exists requiring actuation of the pretensioner device 64. The controller 34 then provides an appropriate control signal to the communications bus 26 of the seat 12, which signal is addressed to the pretensioner device 64. When actuated, the pretensioner device 64 tightens the seat belt webbing 53 around a vehicle occupant.

The system 10 further includes a weight sensor 68 mounted to the vehicle seat 12 for sensing a load applied to the vehicle seat 12. The weight sensor 68 also may be used to detect the presence or absence of a vehicle occupant in the seat 12. The weight sensor 68 is electrically connected to the bus 26. The weight sensor 68 can either be a weight sensing structure internal to the seat bottom 14 or can have one and preferably a plurality of weight sensor transducers 70 and 72 positioned between the lower portion 14 of the seat 12 and the lower body portion 24 of the vehicle. While two such transducers 70, 72 are shown in FIG. 1, it will be understood that typically a greater number of such transducers, such as one at each corner of the seat, can be used. For example, the weight sensor transducers 70 and 72 are mounted at the slidable members of the seat tracks 20 and 22. The weight sensor transducers 70 and 72 may be linear voltage displacement transducers (LVDT) or other known sensing devices such as a strain gauge. The weight sensor transducers 70 and 72 provide signals to the weight sensor block 68 indicative of the weight on the lower portion 14 of the vehicle seat 12. In response to the signals from the transducers 70 and 72, the weight sensor 68 provides to the bus 26 a signal indicative of the weight on the vehicle seat 12. As mentioned, the weight sensor 68 could be an array of weight sensors in the form of a flexible pad within the lower seat portion 14. Appropriate circuitry would monitor the array of sensors and provide, when addressed, a weight signal to the information line 28. The weight sensor signal may be used by any of the actuatable restraint devices 46, 48, 50, and 64 to adjust or control the actuation of such devices. In addition, the controller 34 and/or the controller 47 may use the weight sensor signal to adjust the control signals which it provides to such actuatable devices 46, 48, 50, and 64.

Information regarding occupant weight from sensor 68 is communicated to the controller 34 for use in the control of other actuatable restraints in the vehicle such as front air bags.

From the above description of the invention, those skilled in the art will perceive improvements, changes, and modifications. For example, additional sensors could be incorporated into the seat 12 such as occupant presence sensors, rearward facing infant seat detectors, etc. Additionally, the seat 12 may be configured to contain features for the comfort or convenience of the vehicle occupant, such as, for example, electrically adjustable seat controls, seat memory and other non-safety features. Further, the apparatus 10 might be configured such that the individual functions are isolated via multiple buses, all of which are accessed and controlled by the internal controller 47. Such improvements, changes, and modifications within the skill of the art are intended to be covered by the appended claims.

Having described the invention, the following is claimed:

1. An integrated occupant protection system for a vehicle comprising:

a vehicle seat mountable in the vehicle and having a lower seat portion and a seat back portion;

an electrical communications bus located within said vehicle seat;

a crash sensor for sensing a crash event and providing a signal indicative thereof, said crash sensor located within said vehicle seat and electrically coupled to said communications bus; and an actuatable occupant protection device located within said vehicle seat and electrically coupled to said communications bus for, when actuated, helping to protect a vehicle occupant, said occupant protection device being controlled over said communications bus in response to the crash sensor signal.

2. The system of claim 1 wherein said occupant protection device further comprises an inflatable occupant protection device mounted within said vehicle seat.

3. The system of claim 2 wherein said inflatable occupant protection device further comprises a side impact occupant protection device mounted within said seat back portion.

4. The system of claim 1 further comprising an actuatable occupant protection device mounted within a headrest portion of said vehicle seat, said headrest occupant protection device being electrically coupled to said communications bus.

5. The system of claim 4 wherein said headrest occupant protection device is an inflatable occupant protection device.

6. The system of claim 1 wherein said crash sensor further comprises a side impact crash sensor.

7. The system of claim 1 wherein said crash sensor further comprises a multi-directional sensor element for detecting a crash event originating from any of a plurality of directions, said multi-directional sensor being electrically coupled to said communications bus and providing a signal indicative of a crash event originating from at least one of said plurality of directions.

8. The system of claim 1 further comprising a seat belt pretensioner device attached to said vehicle seat and electrically coupled to said communications bus for protecting a vehicle occupant in response to said crash sensor signal.

9. The system of claim 8 further comprising a seat belt buckle having a switch element electrically coupled to said communications bus, said switch element detecting a belted or an unbelted condition and providing a switch signal indicative of the condition to said communications bus, said seat belt buckle being mounted to said vehicle seat.

10. The system of claim 9 wherein said seat belt pretensioner device is responsive to said switch signal.

11. The system of claim 1 further comprising a weight sensor mounted to said vehicle seat for sensing a load applied to said vehicle seat, said weight sensor coupled to said communications bus for providing a signal indicative of said applied load.

12. The system of claim 1 further comprising an internal controller located within said vehicle seat and electrically connected to said communications bus for monitoring said crash sensor signal and controlling activation of said occupant protection device in response to said crash sensor signal.

13. The system of claim 1 wherein said electrical communications bus includes at least one wire.

14. The system of claim 13 wherein electrical communications and electrical power are provided over the same wire.

15. The system of claim 13 wherein said electrical communications bus includes two wires over which both electrical communications and electrical power are provided.

16. An integrated occupant protection system for a vehicle comprising:
a vehicle seat mountable within the vehicle and having a lower seat portion and a seat back portion;
an internal electrical communications bus located within said vehicle seat for providing control signals to and from a plurality of components and for providing power to at least some of said plurality of components, said plurality of components comprising:
a crash sensor for sensing a crash event and providing a signal indicative thereof, said crash sensor located within said vehicle seat and electrically coupled to said internal communications bus;
an actuatable occupant protection device mounted to said vehicle seat and electrically coupled to said internal communications bus for, when actuated, helping to protect a vehicle occupant in response to said crash sensor signal, said occupant protection device being controlled over said internal communications bus;
a seat belt buckle having a switch element electrically coupled to said internal communications bus, said buckle switch element detecting a belted or unbelted condition and providing a switch signal indicative of said condition to said internal communications bus, said seat belt buckle being mounted to said vehicle seat;
a seat belt pretensioner device mounted to said vehicle seat and electrically coupled to said internal communications bus for helping to protect a vehicle occupant in response to said switch signal and said crash sensor signal; and
a connector electrically coupled to said internal communications bus for providing an electrical interface to said internal communications bus from a location external to said vehicle seat.

17. The system of claim 16 wherein said internal controller provides power to said communications bus for enabling actuation of at least some of said plurality of components.

18. The system of claim 17 wherein said occupant protection device and said pretensioner device receive control signals and power from said internal controller over said communications bus.

19. The system of claim 17 further comprising an internal controller located within said vehicle seat and electrically coupled to said communications bus for selectively controlling said protection device and said pretensioner device over said communications bus in response to said crash sensor signal and said switch signal.

20. The system of claim 19 wherein said controller is mounted to said seat.

21. The system of claim 12 further including an external controller located external to said vehicle seat, said external controller electrically coupled to said communications bus, said external controller providing control signals to said communications bus to control at least one of said crash sensor and said actuatable occupant protection device.

22. An integrated occupant protection system for a vehicle comprising:
a vehicle seat mountable within the vehicle and having a lower seat portion and a seat back portion;
an electrical communications bus mounted to said vehicle seat for providing control signals to and from a plurality of components and for providing power to at least some of said plurality of components, said plurality of components comprising:
a crash sensor for sensing a crash event and providing a signal indicative thereof, said crash sensor mounted to said vehicle seat and electrically coupled to said communications bus;
an actuatable occupant protection device mounted to said vehicle seat and electrically coupled to said communications bus for, when actuated, helping to protect a vehicle occupant in response to said crash sensor signal, said occupant protection device being controlled over said communications bus;
a seat belt buckle having a switch element electrically coupled to said communications bus, said switch element detecting a belted or unbelted condition of said buckle and providing a switch signal indicative of the detected condition to said communications bus, said buckle being mounted to said vehicle seat;
a seat belt pretensioner device mounted to said vehicle seat and electrically coupled to said communications bus for helping to protect a vehicle occupant in response to said switch signal and said crash sensor signal;
a connector electrically coupled to said communications bus for providing an electrical connection to said communications bus, said connector being accessible from a location external to said vehicle seat;
an internal controller electrically coupled to said communications bus and mounted to said vehicle seat, said internal controller receiving signals from at least some of said plurality of components over said communications bus and, in response to said signals from said at least some of said plurality of components, providing control signals to said communications bus to control at least some of said plurality of components; and
an external controller mounted external to said vehicle seat, said external controller electrically coupled to said internal controller through said communications bus and said connector, said external controller providing control signals to said internal controller to control at least some of said plurality of components.

23. An integrated occupant protection system for a vehicle comprising:
a vehicle seat mountable within the vehicle;
an electrical communications bus located within said vehicle seat for providing control signals to and from a plurality of electrical components located within said vehicle seat, said communications bus providing power to at least some of said plurality of components;
a connector electrically coupled to said communications bus for providing an electrical interface to said communications bus from a location external to said vehicle seat;
an internal controller electrically coupled to said communications bus and mounted to said vehicle seat, said internal controller receiving signals from at least some of said plurality of components over said communications bus and, in response to said signals from said at least some of said plurality of components, providing control signals to said communications bus to control selected ones of said plurality of components; and
an external controller located external to said vehicle seat, said external controller electrically coupled to said communications bus through said connector, said external controller providing control signals to said communications bus to control at least some of said internal controller and said plurality of components.

* * * * *